Feb. 8, 1949. C. E. SULLIVAN 2,461,299
FIRE DEFLATION SWITCH
Filed March 24, 1947

Inventor
C. E. Sullivan
By CA Snow & Co.
Attorneys

Patented Feb. 8, 1949

2,461,299

UNITED STATES PATENT OFFICE 2,461,299

TIRE DEFLATION SWITCH

Clarence E. Sullivan, Atlanta, Ga.

Application March 24, 1947, Serial No. 736,787

3 Claims. (Cl. 200—58)

This invention relates to signal devices, and more particularly has reference to a signal device attachable to an automobile or the like, and adapted to inform the operator when the tires of the vehicle require inflation.

The primary object of the invention is to provide a device of the character described which is attachable to any conventionally constructed automobile or like vehicle using pneumatic tires, is simple and inexpensive in design and construction, and is unusually well adapted to inform the operator of the vehicle of any abnormal deflation of one of the tires of the vehicle as soon as such deflation reaches the danger point.

Another important object of the invention is to provide a device of the type described which is unusually durable, and which will not be damaged when a tire becomes completely deflated, even though this should occur suddenly, or when the tires strikes small objects normally encountered, such as stones or the like.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
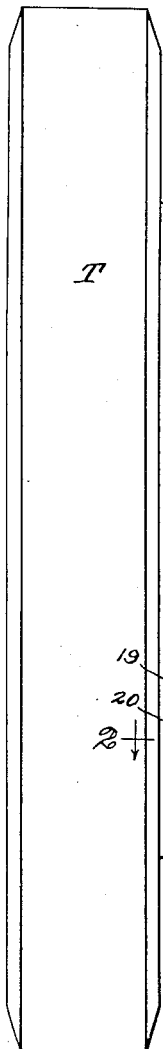
Figure 1 is an elevational view of a signal device constructed in accordance with the invention, mounted in position adjacent the tire of a motor vehicle, parts of the device being shown in vertical section, and electrical connection between the device and instrument panel of the vehicle being illustrated somewhat diagrammatically.

Referring to the drawing in detail, the letter of reference T designates the tire of the vehicle, B a brake housing, A an axle, and P the instrument panel, these parts being of conventional construction and constituting no part of the present invention.

Embodied in the invention is a hinge bracket 5 one end of the arms of which is fixedly connected to the brake housing B, by any suitable means, such as welding or the like. To the outwardly extended arms of the bracket 5 is pivotally suspended, by means of pin 6, the elongated hollow housing 7. The housing 7 is preferably tubular in form, and intermediate its ends, is provided with a stop plate 8, that is fixedly secured in position within the housing by any suitable means.

From a point adjacent the lower end of the housing 7, there is formed in the housing a longitudinal slot 9, that may be terminated intermediate the ends of the housing, and short of the stop plate 8. The housing 7 is also formed with longitudinal slot 10, that is formed in the wall of the housing opposite to slot 9, and is in opposite alignment with slot 9.

Extended into the open lower end of the housing 7 is one end of a shaft 11. The shaft 11 is provided with a stop pin 12, the ends of which project beyond the surface of the shaft, and are received in the longitudinal slots 9 and 10 of the housing 7.

Between the end of shaft 11, that is extended into the housing, and the stop plate 8 of the housing, there is interposed a spiral spring 13. Thus, it is seen that the shaft 11 may yieldably be forced upwardly in the housing 7, but upon removal of the forcing pressure, will be returned promptly to its normal position, which has been illustrated in Figure 1, being held in such position by the spring 13, and stop pin 12 bearing against the ends of the longitudinal slots 9 and 10.

The downwardly extended end of the shaft 11 is formed with a groove, in which is received the tongue 14 on one end of extension 15, the extension 15 being hinged to the lower end of the shaft 11 for swingable movement in a line parallel to the path of the tire T when the vehicle is in motion, by means of a hinge pin 16, which extends through the tongue and groove connection between shaft 11 and extension 15. Opposed flat springs 17, which are connected at one end to the shaft 11, are extended from their respective points of connection downwardly, so as to lie along the surface of the extension 15, on opposite sides thereof. Thus, the springs 17 cooperate to hold the extension 15 so as to be normally coaxial with the shaft 11, and in addition, when the extension 15 is swung in either direction as hereinbefore described, the springs serve the function of returning it promptly to its normal position.

The free end of the extension 15 is provided with a projection that is extended toward the tire T, but is spaced slightly therefrom, so that when the tire is normally in properly inflated condition, the projection will not be engaged by the tire. When, however, air is lost from the tire, the inner side wall thereof will bulge adjacent the ground, and will apply pressure against the projection. This projection is preferably in the form of a disc 18 that is rotatably mounted on the end of the extension 15, and which is formed from rubber material, or other material of similar qualities, so as not to damage the side wall of the tire T.

Figure 2:
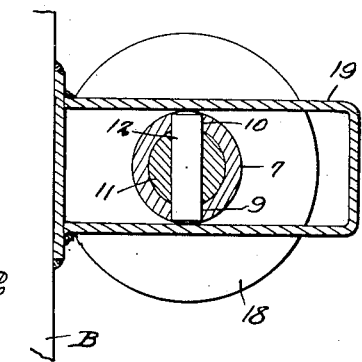
Figure 2 is a view taken on line 2—2 of Figure 1.
Figure 3:
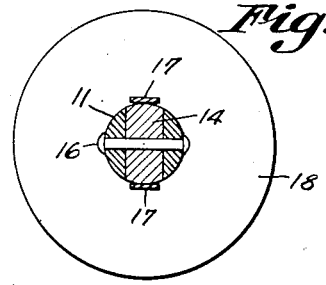
Figure 3 is a view taken on line 3—3 of Figure 1.

Fixedly secured to the brake housing B and extended outwardly relative thereto is a cage 19, that is open at top and bottom, in order to permit the lower end of the housing 7 to be extended therethrough. As shown particularly by Figure 2, the sides of the cage 19 lie closely against the wall of the housing 7, while the closed outer end of the cage is spaced from the wall of the housing. Thus, when the housing 7 is swung on its pivot 6, it will be moved to or away from the ends of the cage 19, while the sides of the cage inhibit movement in any other direction.

From the ends of the cage 19 are extended pins 20, that are extended part way to the wall of the housing 7. Spiral springs 21, that are connected at one end to the ends of the cage, and tensionably engage the wall of the housing 7 on opposite sides thereof, at their other ends, are held in normally extended position by the pins 20.

Mounted on the outer end of the cage 19 and inwardly extended toward the housing 7 is a switch 22, that is adapted to be actuated upon pressure applied by boss 23 on the housing 7. By means of wire 24 leading to the instrument panel P of the vehicle, the switch 22 when actuated provides a signal, which may be in the form of a bulb 25 which is lit upon operation of the switch by contact with the boss 23.

It is understood that a device such as has been described hereinbefore may be attachable to each wheel of the vehicle, there being a corresponding number of bulbs 25 on the instrument panel P, whereby the operator may be informed as to which tire has become abnormally deflated.

In operation of a device constructed in accordance with the invention, a tire which, for instance, may have a slow leak, will become gradually deflated until the steadily increasing bulge in its side wall begins to apply pressure against the disc 18. While the vehicle is in operation, which will often be the case, no damage will result to the side wall by reason of its contact with the disc 18, inasmuch as the disc is rotatably mounted.

However, the pressure of the tire upon the disc will cause the housing 7 to be pivotally swung in a direction away from the tire. The boss 23 on the housing thus is brought into contact with the switch 22, and will apply sufficient pressure thereupon to actuate the switch, thus signalling the operator of the vehicle.

If a tire becomes completely deflated while the vehicle is not in operation, no damage to the device will result by reason of the lower end thereof being brought into contact with upward pressure being obviously exerted thereupon, with the ground. Should this occur, the shaft 11 will be yieldably forced upwardly in the housing 7, in the manner hereinbefore described.

In addition, should the tire or the extension 15 strike an object, such as a stone or the like, while the vehicle is in operation, the extension 15, being mounted for swinging movement in the line of direction in which the vehicle is moving, will pivot on the hinge pin 16, and after the obstacle has been passed, will be returned to normal position by the flat springs 17.

It is further to be noted that the springs 21 maintain the housing 7 in its normal downwardly extended position, and upon the release of pressure whereby the housing is swung on its pivot 6, as would occur in the event of deflation of the tire, will cooperate to return the housing to normal position.

What is claimed is:

1. As an attachment to a motor vehicle, a tire-actuated switch comprising a bracket secured to the brake housing of the wheel on which the tire is mounted, a housing pivotally connected to the bracket at one end for swinging movement in a plane perpendicular to the plane of a tire of the vehicle, the other end being free, a shaft slidable in the housing and having one end extending from the free end thereof, means pivotally connected to said end of the shaft for swinging movement in a plane parallel to the plane of the tire, and positioned relative to the side wall of the tire for movement thereby upon deflation of the tire, whereby the free end of the housing may be pivotally moved, a cage, mounted on the brake housing, through which the free end of the housing is extended, and a contact element mounted on the cage, the contact element being engageable by the end of the housing upon movement of the housing for closing an electrical circuit.

2. As an attachment to a motor vehicle, a tire-actuated switch comprising a bracket secured to the brake housing of the wheel on which the tire is mounted, a housing pivotally connected to the bracket at one end for swinging movement in a plane perpendicular to the plane of a tire of the vehicle, the other end being free, a shaft slidable in the housing and having one end extending from the free end thereof, means hinged to said end of the shaft for swinging movement in a plane parallel to the plane of the tire, and positioned relative to the side wall of the tire for lateral movement thereby upon deflation of the tire, whereby the free end of the housing may be pivotally moved, and an electrical contact element mounted on the vehicle for engagement by the free end of the swung housing.

3. As an attachment to a motor vehicle, a tire-actuated switch comprising a housing hinged at its upper end to a part of the vehicle for swinging movement in a plane perpendicular to the plane of a tire of the vehicle, a shaft telescoping in the housing and extending from the lower end thereof, an extension hinged to the lower end of the shaft for swinging movement in a plane parallel to the plane of the tire, means carried by the extension engageable by a tire upon deflation thereof, whereby to swing the extension, shaft, and housing laterally, and a contact element engageable by the housing when so swung and adapted to close an electrical circuit.

CLARENCE E. SULLIVAN.

REFERENCES CITED

The following references are of record in the file of this patent:

UNITED STATES PATENTS

| Number | Name | Date |
|---|---|---|
| 1,681,608 | Clark | Aug. 21, 1928 |
| 2,082,835 | Kelly | June 8, 1937 |

FOREIGN PATENTS

| Number | Country | Date |
|---|---|---|
| 663,928 | France | Apr. 15, 1929 |
| 673,313 | France | Jan. 23, 1930 |
| 791,580 | France | Sept. 30, 1935 |